March 20, 1934.  T. R. BURKE  1,951,963

FLUSH VALVE

Filed May 18, 1933

Inventor
T. R. Burke.
By Lacey & Lacey, Attorneys

Patented Mar. 20, 1934

1,951,963

UNITED STATES PATENT OFFICE 1,951,963

FLUSH VALVE

Thomas Richard Burke, San Francisco, Calif.

Application May 18, 1933, Serial No. 671,765

9 Claims. (Cl. 137—93)

This invention relates to flush valves of the piston or plunger type and has for its primary object to provide means whereby to reduce objectionable sounds incident to the closing of such valves when installed in high or moderately high pressure water systems and usually referred to as whistling, wire drawing, thumping or murmuring sounds.

A further object of the invention is to provide a flush valve including a sectional shield or housing which surrounds and protects the main operating unit of the valve and is insulated therefrom so as to prevent the transmission of vibrations and other objectionable noises incident to the operation of said valve.

A further object is to provide a novel form of valve seat which not only functions as such but also serves to hold the valve body and lower shield section securely in assembled position.

A further object is to provide a removable and renewable valve seat having cushioning gaskets associated therewith and interposed between the valve body and lower shield section and between said valve body and the valve seat proper whereby to prevent back pressure leakage when the valve is discharging and leakage into the outlet from the line or city pressure at all times.

A further object is to so arrange the gaskets of the valve seat with respect to the protecting shield that said gaskets operate to absorb vibration and arrest sounds incident to the operation of the valve, especially at the instant of closing and thus render the action of the valve practically noiseless.

A still further object of the invention is generally to improve this class of devices so as to increase their utility, durability, efficiency and sanitary effect.

In the accompanying drawing forming a part of this specification:

Similar numerals of reference indicate corresponding parts in all the figures of the drawing.

Figure 1:
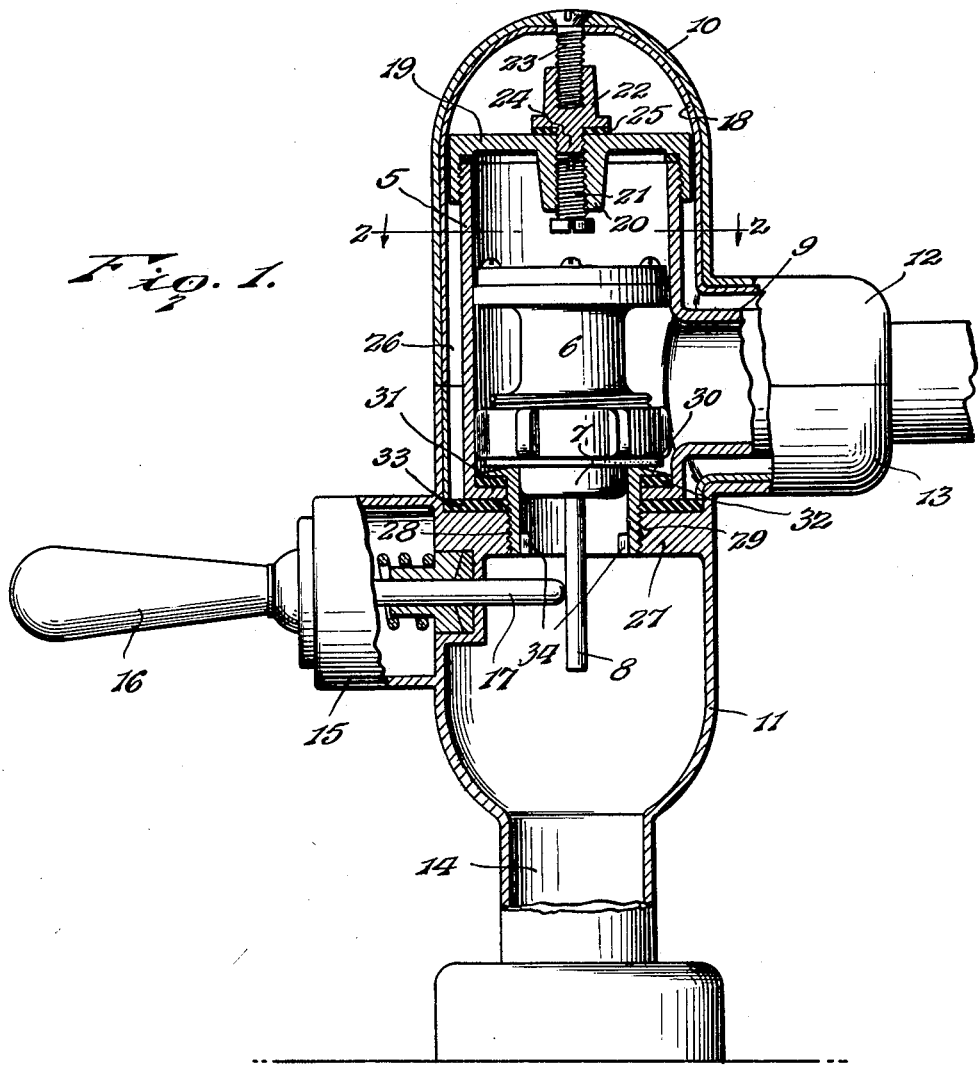
Figure 1 is a vertical sectional view, partly in side elevation, of a flush valve constructed in accordance with the present invention and showing the flush valve unit seated and the moving unit or piston likewise seated.
Figure 2:
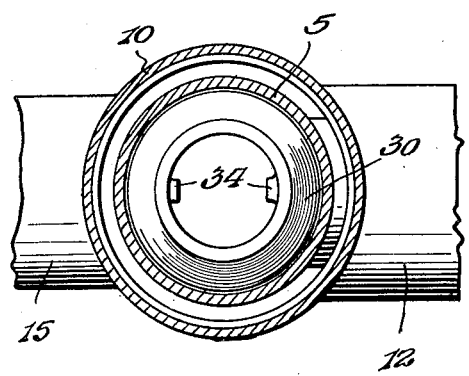
Figure 2 is a transverse sectional view taken on the line 2—2 of Figure 1, with the moving unit or piston omitted.

The improved device forming the subject matter of the present invention is principally designed for use in connection with flush valves of the piston or plunger type and by way of illustration is shown in connection with a commercial valve of this character in which 5 indicates the valve casing having a vertically movable piston 6 operating therein and provided with the usual refill ring 7 and auxiliary valve stem 8, the casing 5 being formed with a branch or inlet pipe 9 connected in any suitable manner with the line or city pressure.

Surrounding the valve casing 5 is a protecting shield or housing preferably formed of upper and lower sections 10 and 11, the upper section 10 being provided with a lateral extension 12 which fits over the branch pipe 9 and its usual coupler and the lower section 11 being provided with a similar extension 13 which abuts against the mating section 12 so as to completely enclose, insulate, muffle and protect the flush valve body and parts. The lower shield section 11 is provided with an outlet 14 which connects in any suitable manner with the rear portion of the closet bowl or other fixture, not shown, and said lower section is also provided with a hollow boss 15 in which is mounted an operating handle 16 of conventional construction, the inner end of the handle being provided with a plunger 17 which coacts with the stem 8 to effect the operation or opening of the valve in the usual manner. The inner surface of the upper shield section 10 as well as a portion of the lower section 11 is preferably covered with suitable insulating material 18 such as felt, asbestos, or the like, so as to render the shield sweat proof and sound proof. The upper end of the valve casing 5 is closed by a head 19 threaded thereon and provided with a depending boss 20 in which is mounted a regulating screw 21 for controlling the movement of the piston 6, and arranged above the boss 20 is a sealing cap 22 into which is threaded a screw 23, the head of which is countersunk in the upper shield section 10 and serves to clamp the upper and lower sections together. The sealing cap 22 is provided with a depending stud 24 threaded in the boss 20 and a washer 25 is preferably interposed between the sealing cap and head 19 around said stud to prevent leakage outwardly along the stem of the regulating screw. The regulating screw 21 has a slot at its upper end as well as at its lower end so that said screw may be adjusted with a screw driver from the outside without shutting off the water and without taking the cap 19 off the valve to get to the lower slot. The valve casing 5 as well as the inlet nipple 9 are preferably spaced from the adjacent walls of the shield to form an intermediate chamber 26 so that the parts are always separated and air may circulate therebetween. The lower shield section 11 is provided with an inwardly extended abutment flange 27 of sufficient strength and thickness to resist vibrations, said flange being provided with a central opening, the walls of which are threaded at 28 for engagement with the correspondingly exteriorly threaded walls of a nipple 29. The upper end of the nipple 29 is formed with a lateral flange 30 which coacts with the piston and forms a valve seat therefor. The lower end of the valve casing 5 is provided with an inwardly extending locking flange 31 of substantially the same length as the flange 30 of the valve seat and interposed between the flanges 30 and 31 is a gasket 32, there being a similar gasket 33 interposed between the upper surface of the abutment flange 27 and the lower surface of the locking flange 31, thereby to prevent the transmission of vibrations and hissing from the valve seat to the protecting shield incident to closing of the valve and consequently preventing objectionable sounds commonly referred to as whistling or wire drawing sounds. The gasket 31 is preferably of sufficient length to extend across and close the passage 26 and this construction prevents back pressure leakage when the valve is in the act of discharging while the upper gasket 32 prevents the line or city pressure from seeping or leaking downwardly into the outlet 14 of the lower shield section. Projecting laterally from the inner wall of the nipple 29 at the lower end thereof are one or more lugs 34 adapted to be engaged by a suitable tool when the valve 6 is removed for the purpose of threading the nipple into the reinforcing flange 27 and compressing the gaskets. It will here be noted that the nipple 29 not only serves to hold the valve seat in position but also serves to clamp the valve casing 5 securely in position on the lower shield section 11, thereby dispensing with the employment of screws and similar fastening devices for this purpose. It will also be noted that by reason of the fact that the nipple is threaded in the abutment flange 27, the valve may be easily removed and hence readily detached for the purpose of repair or inspection when desirable or necessary. It is also obvious that when the nipple is threaded home the valve seat 30 will engage and partially compress the gasket 32, thereby holding both gaskets against displacement while at the same time clamping the valve casing to the reinforcing flange 27 of the lower shield section and effectually prevent leakage around the parts. It will thus be seen that after the flushing of the closet bowl has been effected and the valve piston moves downwardly in the direction of its seat, objectionable noises characteristic of this type of valve which usually occur as the valve piston approaches its seat and known as whistling or wire drawing noises, are eliminated, as the gaskets tend to receive and absorb objectionable sounds and the heavy flange 27 tends to resist vibration while the insulating lining of the shield assists in preventing the transmission of sounds to the exterior of the shield. Therefore, objectionable noises inherent in valves of this character are reduced to a minimum.

As the piston and its associated parts comprising the valve proper operate in the usual manner and form no part of the present invention, a detailed description of the operation of said valve is deemed unnecessary.

Having thus described the invention, what I claim is:

1. A flush valve comprising upper and lower shield sections one of which is provided with an outlet, a valve casing disposed within said sections and provided with an inlet, a valve in said casing, and a valve seat forming a detachable connection between the valve casing and said lower shield section.

2. A flush valve comprising upper and lower shield sections one of which is provided with an outlet, a valve casing disposed within said sections and provided with an inlet, a valve in said casing, a valve seat detachably engaging the casing and lower section for clamping the valve casing to said lower section, and gaskets interposed between the lower section and valve casing and between said valve casing and valve seat.

3. A flush valve comprising upper and lower shield sections one of which is provided with an outlet, a valve casing disposed within the lower section and provided with an inlet and a locking flange, an inwardly extended abutment flange forming a part of the lower shield section, and a valve seat threaded in said abutment flange and engaging the locking flange of the valve casing for detachably securing the valve casing to said lower shield section.

4. A flush valve comprising upper and lower shield sections one of which is provided with an outlet and an inwardly extended abutment flange, a valve casing disposed within the lower section and having its lower end provided with an inwardly extending locking flange and its side wall formed with an inlet, a valve operating within the casing, a nipple threaded in the abutment flange and provided with a valve seat, and gaskets interposed between the abutment flange and locking flange and between the locking flange and valve seat.

5. A flush valve comprising upper and lower shield sections one of which is provided with an outlet and an inwardly extended abutment flange, a valve casing spaced inwardly from the shield sections to form an intermediate passage and provided with an inlet, said valve casing having its lower end formed with an inwardly extending locking flange, a nipple threaded in the abutment flange and having its upper end formed with a valve seat, and gaskets interposed between the valve seat and locking flange and between said locking flange and abutment flange, one of said gaskets extending across and normally closing said passage.

6. A flush valve comprising upper and lower shield sections one of which is provided with an outlet and an inwardly extended abutment flange, a valve casing disposed within the lower section and having its lower end formed with a locking flange arranged above the abutment flange and its side wall provided with an inlet, a nipple threaded in the abutment flange and having its upper end provided with a lateral flange constituting a valve seat, wrench engaging lugs formed on the inner wall of the nipple, and gaskets interposed between the abutment flange and locking flange and between the locking flange and the flange of the valve seat whereby when the nipple is screwed home the gaskets will be partially compressed and the valve casing securely clamped to the lower shield section.

7. A flush valve comprising upper and lower shield sections one of which is provided with an outlet and the other with an inwardly extended abutment flange, a valve casing disposed within the lower section and having its upper end closed and its lower end open and provided with an inwardly extended locking flange, a valve in said casing, a nipple threaded in the abutment flange and provided at its upper end with a lateral flange constituting a valve seat, gaskets interposed between the flange of the nipple and the locking flange of the casing and between said locking flange and the abutment flange, a sealing cap threaded in the upper end of the valve casing, a screw extending through the upper shield section into said sealing cap for holding the shield sections together, and a washer interposed between the sealing cap and the closed end of the valve casing.

8. A flush valve comprising upper and lower shield sections one of which is provided with an outlet and with an internal abutment flange, a valve casing disposed within the lower shield section and provided with an inwardly extending locking flange, a valve operating within the casing, a valve seat detachably secured to the abutment flange and engaging the locking flange for clamping the valve casing to the lower shield section, a cushioning element interposed between the locking flange and abutment flange, and fastening means between the upper shield section and the valve casing for holding said upper and lower shield sections in assembled position.

9. A flush valve comprising upper and lower shield sections one of which is provided with an outlet, a valve casing disposed within the lower section and provided with an inlet and a depending boss, a valve in said casing, a regulating screw threaded in the boss and having its upper and lower ends provided with tool receiving slots, a sealing cap having a depending stud threaded in the upper end of the valve casing in spaced relation to the regulating screw, a washer surrounding the stud and interposed between the sealing cap and top of the valve casing, and a clamping screw extending through the upper shield section and engaging the sealing cap.

THOMAS RICHARD BURKE. [L. S.]